US00RE48910E

(19) United States
(12) Reissued Patent
Shield et al.

(10) Patent Number: US RE48,910 E
(45) Date of Reissued Patent: Feb. 1, 2022

(54) VENTED SOFFIT PANEL

(71) Applicant: Rollex Corporation, Elk Grove Village, IL (US)

(72) Inventors: Mikkel Shield, Elgin, IL (US); Paul R. Pavesich

(73) Assignee: Rollex Corporation, Elk Grove Village, IL (US)

(21) Appl. No.: 15/005,311

(22) Filed: Jan. 25, 2016

Related U.S. Patent Documents

Reissue of:
(64) Patent No.: 8,826,603
Issued: Sep. 9, 2014
Appl. No.: 12/807,293
Filed: Aug. 31, 2010

(51) Int. Cl.
*E04D 13/158* (2006.01)

(52) U.S. Cl.
CPC ..... *E04D 13/158* (2013.01)

(58) Field of Classification Search
CPC ..... E04D 13/158
USPC ..... 52/95
See application file for complete search history.

(56) References Cited

U.S. PATENT DOCUMENTS 764,989 A * 7/1904 Ohester ..... 52/450
3,496,691 A * 2/1970 Seaburg et al. ..... 52/336
5,172,527 A * 12/1992 Ault ..... 52/145
5,551,204 A * 9/1996 Mayrand ..... 52/795.1
6,516,577 B2 * 2/2003 Pelfrey et al. ..... 52/302.1
6,941,707 B2 * 9/2005 Sigmund ..... 52/95
7,137,224 B2 * 11/2006 Rasmussen et al. ..... 52/96
7,594,362 B2 * 9/2009 Sigmund et al. ..... 52/96
8,028,475 B2 * 10/2011 Sigmund et al. ..... 52/95
2002/0072324 A1 * 6/2002 Strait ..... 454/365
2004/0216397 A1 * 11/2004 Sigmund ..... 52/95
2010/0126083 A1 * 5/2010 Rasmussen et al. ..... 52/95

* cited by examiner

*Primary Examiner* — Russell D Stormer
(74) *Attorney, Agent, or Firm* — Seyfarth Shaw LLP

(57) ABSTRACT

A vented soffit panel is provided. The soffit panel includes a first panel section, a second panel section and a vent channel. The vent channel is positioned between the first and second panel sections and extends along a width of the soffit panel. The vent channel has a generally dove-tailed shape defined by a first sidewall extending from the first panel section at an acute angle relative thereto, a second sidewall extending from the second panel section at an acute angle relative thereto and a top wall extending between the first and second sidewalls. The top wall has at least one row of openings extending substantially along the width. The row of openings in the top wall being positioned such that when the panel is installed the row of openings are obscured from a view of an ordinary observer by at least one of the first and second panel sections.

20 Claims, 1 Drawing Sheet

Amended

Amended Fig. 1

VENTED SOFFIT PANEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD OF THE INVENTION

The present device relates to soffit panels. Particularly, the present device relates to vented soffit panels, such as used on houses and buildings.

BACKGROUND OF THE INVENTION

Soffits are generally used to cover the underside of eaves of homes and other structures which have roof designs wherein the roof extends out over the edge of the structure. Generally, soffits are designed such that they are visible to those located below the eaves and oftentimes are desired to be visually appealing.

Moreover, soffits serve a number of functional purposes, such as to permit air to circulate therethrough to reduce condensation and allow heat to escape from the roof and attic area. Such soffits are typically referred to as vented soffits. In this regard, a number of vented soffits have been designed having a plurality of holes or openings in the soffit to allow ventilation air flow. Additionally, beyond reducing condensation permitting air to flow therethrough, vented soffits are also generally designed to prevent other objects such as insects, animals and leaves from passing through the soffit area and into the attic area. However, vented soffits which permit air and condensation to flow therethrough which have visible openings may be aesthetically displeasing to some observers when looking upwardly at the vented soffit.

To achieve a vented soffit which is both functional and aesthetically pleasing, a number of individuals have attempted to design vented soffit panels which have openings which are at least partially obscured when the soffit panels are installed, so that the soffit panel has a smoother-looking appearance. For instance, examples of such vented soffit panels are discussed in U.S. Pat. Nos. 6,941,707 and 7,137,224. However, such vented soffit panels have obscured openings which suffer from a number of problems, such as, for example, poor circulation, weakened panel structures, brittle panels and may also may be problematic to install.

For example, even if the vented soffit has hidden openings so that the openings cannot be viewed by an observer from the ground looking upward, the openings must have sufficient surface area to permit necessary ventilation flow rates. In this regard, a number of attempts have been made to place all of the openings on the sidewalls of a partially hidden channel. However, this may present problems as, in some instances, either not enough openings located on the sidewalls of the channels and/or the openings must be located close to the edges of the sidewalls, thereby creating weakened points in the soffit. These weakened points can be problematic as oftentimes when the soffit panel is installed, the soffit panel may need to be bent or flexed to ensure a proper fitment. In this regard, the weakened edges of the sidewalls may create failure points where the soffit panel may break or tear.

Moreover, some of the traditional methods of creating the openings have caused stress points, thereby making the soffits brittle. For example, die stamping is oftentimes used to create the openings in vented soffit panels. Die stamping is typically a violent procedure that punches holes into the metal portions of the soffit panels, which can then create regions of stress in the material of the soffit. These stress regions, and especially when combined with locating the openings near the edge of the side walls of the vented soffits, can cause the soffit to be brittle and/or otherwise susceptible to breaking.

SUMMARY OF THE INVENTION

In one form, a vented soffit panel is provided. The soffit panel includes a first panel section, a second panel section and a vent channel. The vent channel is positioned between the first and second panel sections and extends substantially along a width of the soffit panel. The vent channel has a generally dove-tailed shape, defined by a first sidewall extending from the first panel section at an acute angle relative thereto, a second sidewall extending from the second panel section at an acute angle relative thereto, and a top wall extending between the first and second sidewalls. The top wall has at least one row of ventilation openings or perforations extending substantially along the length thereof. The openings in the top wall are positioned such that the openings are obscured by at least one of the first and second panel sections.

According to one form, a vented soffit panel is provided. The vented soffit panel includes a first panel section, a second panel section and a vent channel positioned between the first and second panel sections and extends substantially along a width of the soffit panel. The vent channel has a generally dove-tailed shape defined by a first sidewall extending from the first panel section, a second sidewall extending from the second panel section and a top wall extending between the first and second sidewalls. The first and second panel sections define an exposed width of the channel. Each of the first and second sidewalls and the top wall have at least one row of ventilation openings or perforations extending substantially along the width. The openings in the top wall are positioned outside of the exposed width.

In accordance with one form, the vented soffit panel further includes at least two rows of ventilation openings or perforations in each of the first and second sidewalls.

In one form, each of the two ventilation rows are offset from one another such that the spacing between ventilation openings in each row is in the range of about 0.15-0.30 inches and the spacing between the rows is in the range of about 0.10-0.20 inches.

According to one form, the channel has a height and the top wall has an overall width that is at least three times the height of the channel.

In accordance with one form, the ventilation openings are generally circular in shape and have a diameter in the range of about 0.080 to 0.100 inches, although it will be appreciated that the openings can take the form of any shape.

In one form, the exposed width is in the range of about 0.20-0.30 inches.

According to one form, a method of manufacturing a vented soffit panel is provided. The method includes the steps of: passing a material, preferably metal, such as, for example, aluminum, through a rotary perforation machine to create a perforated blank having a plurality of perforations and at least one set of a plurality of rows of ventilation openings extending substantially along a width of the perforated blank, and folding the perforated blank to create a vent channel defined by first and second panel sections and extending along a width of the soffit panel, the vent channel having a generally dove-tailed shape defined by a first sidewall extending from the first panel section at an acute angle relative thereto, a second sidewall extending from the second panel section at an acute angle relative thereto and a top wall extending between the first and second sidewalls, the set of the plurality of rows of ventilation openings being positioned such that each of the first and second sidewalls and the top wall includes at least one row of openings, and the row of openings in the top wall being positioned such that the row of openings are obscured from view of an ordinary observer looking upwardly at an installed vented soffit panel by at least one of the first and second panel sections.

In one form, the step of folding the perforated blank includes creating a plurality of vent channels.

According to one form, the step of folding the perforated blank includes creating at least two rows of openings in each of the first and second sidewalls.

In accordance with one form, the step of folding the perforated blank includes creating each of the two rows are offset from one another such that the spacing between ventilation openings in each row is in the range of about 0.15-0.30 inches and the spacing between the rows is in the range of about 0.10-0.20 inches.

In one form, the step of folding the perforated blank includes creating the channel having a height and the top wall having an overall width that is at least three times the height of the channel.

According to one form, the step of folding the perforated blank includes creating the ventilation openings having a generally circular shape having a diameter in the range of about 0.080 to 0.100 inches, although it will be appreciated that the ventilation openings can take the form of any shape.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 1 is a perspective view of one form of a vented soffit panel of the present application having a portion of the panel broken away to show a portion of a channel;

Figures 2, 3, 4:
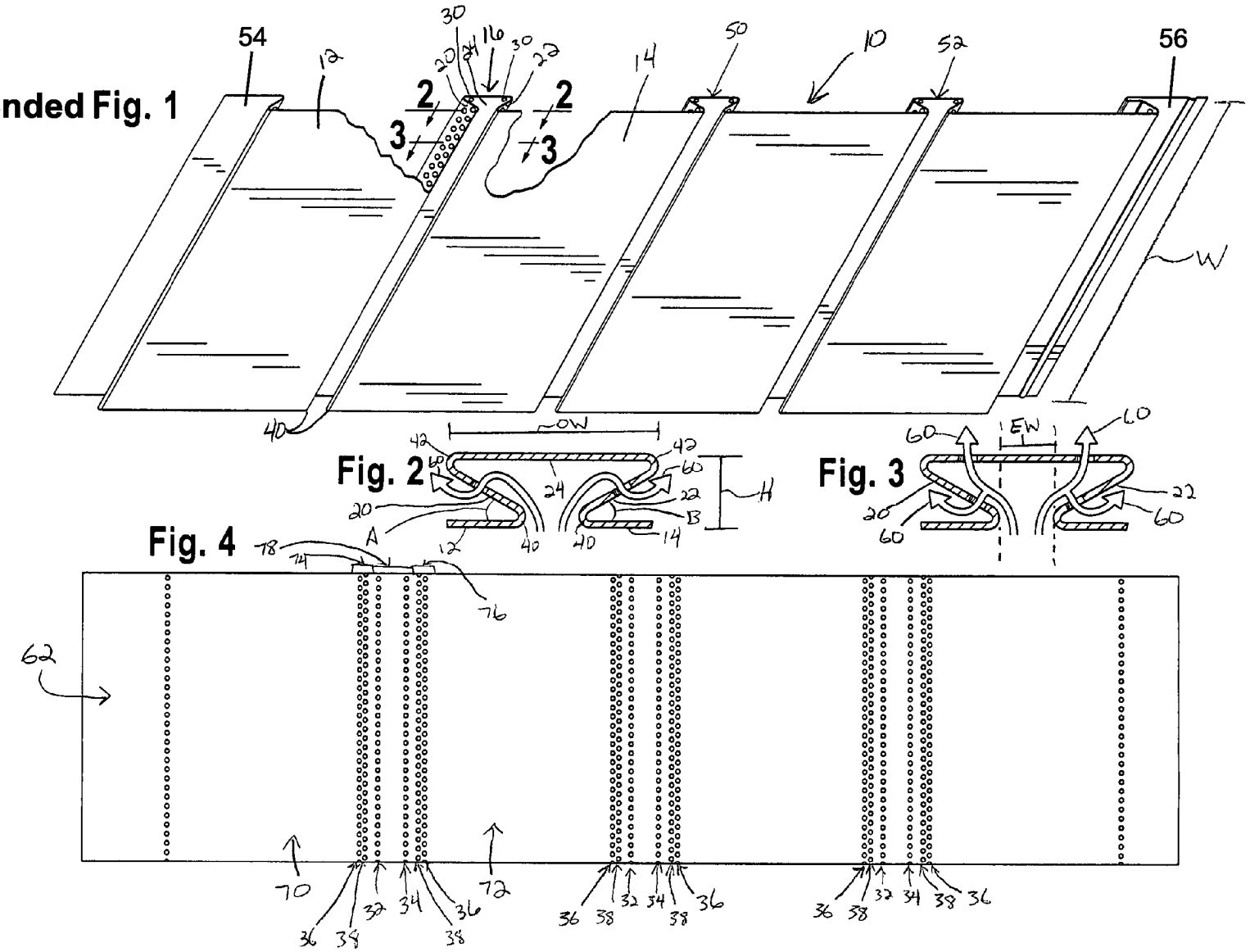
FIG. 2 is a cross-sectional view of a portion of a channel taken along line 2-2 of FIG. 1.
FIG. 3 is a cross-sectional view of a portion of a channel taken along line 3-3 of FIG. 1.
FIG. 4 is a top plan view of a perforated blank of the present application prior to being folded into a final vented soffit panel.

Various figures are presented to further aid one skilled in the art in understanding the various forms of the vented soffit panel. However, the present invention should not be construed to be limited to the forms depicted in the figures and described herein.

DETAILED DESCRIPTION OF PREFERRED EMBODIMENTS

While this invention is susceptible of embodiments in many different forms, there is shown in the drawings and will herein be described in detail various embodiments of the invention with the understanding that the present disclosure is to be considered as an exemplification of the principles of the invention and is not intended to limit the broad aspect of the invention to embodiments illustrated.

Referring to FIG. 1, there is illustrated a vented soffit panel 10. The panel 10 includes a first panel section 12, a second panel section 14 and a vent channel 16. As seen in FIG. 1, the channel 16 is positioned between the first and second panel sections 12 and 14. The panel 10 has a width W and the first and second panels sections 12 and 14, as well as channel 16, extend substantially along the width W of the panel 10.

As best seen in FIGS. 2 and 3, the channel 16 is defined by a first sidewall 20 extending from the first panel section 12, a second sidewall 22 extending from the second panel section 14 and a top wall 24. In one form, the top wall 24 extends between the first and second sidewalls 20 and 22. Further, as shown in FIG. 2, the first sidewall 20 extends from the first panel section 12 at an angle A and the second sidewall 22 extends from the second panel section 14 at an angle B. In one form, angle A and angle B are each acute angles. For example, angles A and B may each fall in the range of about 15° to 40°. In one form, each of angles A and B are about 30°.

Referring now to the cut away portion of FIG. 1, it can be seen that the top wall 24 includes a plurality of ventilation openings 30. As shown in FIGS. 1 and 4 (FIG. 4 illustrates a panel 10 prior to final forming to better illustrate the openings 30), in one form, the top wall 24 includes two rows 32 and 34 of openings 30 which extend substantially along the width W. Additionally, in one form, the sidewalls 20 and 22 each include openings 30. For example, as shown in FIG. 4, the sidewalls 20 and 22 each have two rows 36 and 38 of openings 30. It should be understood that the sidewalls 20 and 22 and the top wall 24 may each have any number of openings 30 and respective rows of openings 30 as desired. Furthermore, it should be understood that the openings 30 need not be positioned in rows as illustrated in FIG. 4, but instead may be more randomly placed. As shown in FIG. 4, in one form, the rows 36 and 38 of openings 30 are offset relative to each other. However, it should be understood that the rows 36 and 38 need not be offset.

In one form, the openings 30 are positioned such that the openings 30 are substantially obscured from view when the panel 10 is installed in a soffit area of a house or other structure and an ordinary observer is looking upwardly toward the install panel 10. In this regard, the openings 30 in the sidewalls 20 and 22 generally will not be visible to such observer as they would be substantially obscured respectively by the first and second panel sections 12 and 14. Moreover, in one form, the openings 30 in the top wall 24 are positioned such that they are at least substantially obscured from view when the panel 10 is installed in a soffit area of a house or other structure and an ordinary observer is looking upwardly toward the install panel 10. In this regard, the openings 30 in the top wall 24 may be obscured by at least one or both of the first and second panel sections 12 and 14. Furthermore, the openings 30 in the top wall 24 may also be obscured by the sidewalls 20 and 22. For example, when the panel 10 is installed, it is generally positioned above the observer such that the observer is looking upwardly and has a somewhat restricted viewing angle such that the first and second panel sections 12 and 14 and/or the sidewalls 20 and 22 obscure the openings 30 in the top wall 24. In this regard, the channel has an exposed width EW, such as seen in FIG. 3, when the channel is viewed by such observer from directly below. In one form, the openings 30 in the top wall 24 are located outside of the exposed width EW, as shown in FIG. 3.

The panel 10 and channel 16 may take a variety of shapes and forms as understood by those skilled in the art. For example, the panel 10 may have a generally rectangular shape, but may take any desired shape. Furthermore, the panel 10 may be generally about 24 inches which covers about 16 inches when installed and overlapped with adjacent panels 10.

Additionally, in one form, the channel 16 has a generally dove-tailed shape as shown in FIGS. 1-3. However, the channel 16 may take a variety of shapes and sizes as desired. The shape of the channel 16 may be defined by the size and shape of the sidewalls 20 and 22 and the top wall 24. For example, in one form, the sidewalls 20 and 22 and the top wall 24 are generally flat wherein the top wall 24 is significantly larger than the sidewalls 20 and 22 to provide a generally dove-tailed shape and to provide an area for openings 30. However, the sidewalls 20 and 22 and the top wall 24 may also have an arcuate or other shape so as to modify the overall shape of the channel 16.

Further, the sidewalls 20 and 22 meet the respective first and second panel sections 12 and 14 at corners 40. These corners 40 may be made as sharp or soft as desired by decreasing or increasing the radius of the corners 40. In one form, the radius of the corners 40 is approximately 0.050 inches. The radius of the corners 40 may be modified as necessary to improve the strength of the panel 10 and/or modify the shape of the channel 16.

The channel 16 has a height H while the top wall 24 has an overall width OW such as shown in FIG. 2. In one form, the overall width OW is larger than the height H. In yet another form, the overall width OW is at least three times the height H. In this form, the channel 16 has a somewhat squated and wide profile. By having such a profile, a larger portion of the top wall 24 is available for placement of the openings 30. This may also help obscure the openings 30 as the overall width OW is much larger than the exposed width EW.

The openings 30 may be placed any distance from the corners 40 and upper corners 42. In one form, it may be desirable to place the openings a certain distance from the corners 40 and 42 so as to avoid creating weakened portions near the corners 40 and 42. In one form, by having a large overall width OW compared to the exposed width EW, it may be possible to locate multiple rows 32 and 34 of openings in the top wall 24, such as shown in FIGS. 3 and 4. In this regard, fewer rows may be located on the sidewalls 20 and 22 as sufficient fluid flow may be provided by the combination of rows 32, 34, 36 and 38. However, it should be understood that any number of rows may be placed on the sidewalls 20 and 22 as desired. In one form, the openings 30 are located about 0.0895 inches from the corners 40 and about 0.269 inches from the corners 42.

Furthermore, the openings 30 may be placed any distance from one another as desired. For example, in one form, the openings 30 in each row 32, 34, 36 and 38 may be located about 0.15-0.30 inches from one another center-to-center. In another form, the openings 30 in each row 32, 34, 36 and 38 may be located about 0.19 inches from one another center-to-center. Similarly, the rows on each respective side, such as rows 36 and 38 may be located any distance from one another. In one form, the rows 36 and 38 are located about 0.10-0.20 inches from one another center-to-center. In another form, the rows 36 and 38 are located about 0.12 inches from one another center-to-center.

The openings 30 may also take a variety of forms and shapes. As shown in the figures, the openings 30 have a generally circular shape. In one form, the openings 30 have a diameter in the range of about 0.080-0.100 inches. In another form, the openings have a diameter that is about 0.086 inches. However, it should be understood that the openings 30 may take other forms such as oblong slots and the like.

As shown in FIG. 1, the panel 10 may include multiple channels. For example, as shown, the panel 10 has three channels 16, 50 and 52. Channels 50 and 52 may be generally the same shape and size as channel 16. Alternatively, the channels 16, 50 and 52 may take different sizes and shapes and have different openings 30 as desired. Moreover, the panel 10 may include end connectors 54 and 56. The end connectors 54 and 56 may be used to mate with connectors from adjacent panels 10 to create a continuous soffit when installed. Moreover, the end connectors 54 and 56, when joined, may form a further channel (not shown). This further channel may be substantially the same as or different from channel 16. For example, the further channel may have fewer openings 30 than channel 16.

As shown in FIGS. 2 and 3, the openings 30 permit fluid, such as air, to flow through the channel 16, as shown by arrows 60. As shown in these figures, fluid is flowing into and through the channel 16. However, it should be understood that fluid may also flow out of and through the channel 16.

The panel 10 may be manufactured in a number of manners. In one form, the openings 30 are created using a rotary perforating machine (not shown) to create a perforate blank 62. Generally, rotary perforation passes a blank material between two rollers having corresponding male and female components to create the openings 30. In this regard, it may be possible to minimize the stress on the material at the locations of the openings 30 when compared to traditional die stamping methods. Further, rotary perforating may also provide for a faster manufacturing process. Additionally, traditional die stamping processes often require or otherwise utilize a quenching process which may be unnecessary in a rotary perforating process.

After the perforate blank 62 has been created, it is passed on to additional machinery to create the formed soffit panel 10. In this regard, the perforate blank may be folded or otherwise formed as understood by those skilled in the art to create the panel 10. For example, referring to FIG. 4, portions 70 and 72 will eventually form part of the first and second panel sections 12 and 14 while portions 74, 76 and 78 will form the sidewalls 20 and 22 and the top wall 24, respectively after final processing.

The panel 10 may be manufactured from any number of different materials as understood by those skilled in the art. For example, in one form, the panel 10 is created from metal, such as aluminum or steel. In another form, the panel 10 is created from plastic such that it may be extruded. In yet another form, the panel 10 can be created using a combination of metals and/or plastics. However, it should be understood that other forms are also contemplated as understood by those skilled in the art.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A vented soffit panel comprising:

a first panel section;

a second panel section; and a three-walled vent channel positioned between the first and second panel sections, the vent channel defined by a first sidewall extending from the first panel section at a first acute angle relative to the first panel section, a second sidewall extending from the second panel section at a second acute angle relative to the second panel section, and a top wall extending between the first sidewall and the second sidewall, a third acute angle between the top wall and the first sidewall and a fourth acute angle between the top wall and the second side wall;

a first row of holes through the top wall disposed above and overlapping the first panel section, the first angle, second angle, third angle and fourth angle being substantially equal and defining a dovetail geometry of the three-walled vent channel such that the first row of holes is obscured from view by at least one of the first and second panel sections; and a second row of holes through the first sidewall.

2. The vented soffit panel of claim 1 wherein the first and second sidewalls each include at least two rows of holes.

3. The vented soffit panel of claim 1 wherein the channel has a height and the top wall has an overall width that is at least three times the height of the channel.

4. The vented soffit panel of claim 1 wherein the acute angles are each in the range of about 15-40 degrees.

5. The vented soffit panel of claim 1, comprising:

a third row of holes through the top wall disposed above and overlapping the second panel section, the first angle, second angle, third angle and fourth angle defining the dovetail geometry of the three-walled vent channel such that the third row of holes is obscured from view by the second panel section; and a fourth row of holes through the second sidewall.

6. The vented soffit panel of claim 5, wherein the holes each have a diameter in the range of about 0.080 to 0.100 inches and the first row of holes is offset from the third row of holes such that the spacing between the holes in each row is in the range of about 0.15-0.30 inches and the spacing between the first row holes and the third row of holes is in the range of about 0.10-0.20 inches.

7. A method of manufacturing a vented soffit panel comprising the steps of:

passing a material through a rotary perforation machine to create a perforated blank having a first row of holes and a second row of holes extending substantially along a width of the perforated blank; and folding the perforated blank to create a three-walled vent channel defined by first and second panel sections, the three-walled vent channel having a generally dovetailed shape defined by a first sidewall extending from the first panel section at a first acute angle relative to the first panel section and a second sidewall extending from the second panel section at a second acute angle relative to the second panel section, and a top wall extending between the first sidewall and the second sidewall, a third acute angle between the top wall and the first sidewall and a fourth acute angle between the top wall and the second side wall;

wherein the first row of holes extends through the top wall and is disposed above and overlapping the first panel section, the first angle, second angle, third angle and fourth angle being substantially equal and defining a dovetail geometry of the three-walled vent channel such that the first row of holes is obscured from view by at least one of the first and second panel sections; and wherein the second row of holes extends through the first sidewall.

8. The method of claim 7 wherein the step of folding the perforated blank includes creating a plurality of vent channels.

9. The method of claim 7 wherein the step of folding the perforated blank includes creating at least two rows of holes in each of the first and second sidewalls.

10. The method of claim 7 wherein the step of folding the perforated blank includes creating the channel having a height and the top wall having an overall width that is at least three times the height of the channel.

*11. A vented soffit panel, comprising:*

*first and second panel sections;*

*a vent channel positioned between the first and second panel sections, the vent channel defined by:*

*a first sidewall extending from the first panel section at a first acute angle relative to the first panel section, and forming a first corner;*

*a second sidewall extending from the second panel section at a second acute angle relative to the second panel section, and forming a second corner;*

*a top wall extending between the first and second sidewalls, a third acute angle formed between the top wall and the first sidewall and a fourth acute angle formed between the top wall and the second side wall, wherein the first, second, third and fourth acute angles are substantially equal and the vent channel has a substantially dovetail geometry; and*

*an opening extending between the first and second corners and forming an exposed width that projects substantially perpendicular to the top wall;*

*a first row of holes disposed in the top wall vertically above the first panel section and laterally outside of the exposed width; and*

*a second row of holes disposed in the first sidewall.*

*12. The vented soffit panel of claim 11, wherein the second row of holes includes at least two rows of holes.*

*13. The vented soffit panel of claim 11, wherein the channel has a height and the top wall has an overall width that is at least three times the height.*

*14. The vented soffit panel of claim 11, wherein the first, second, third and fourth acute angles are each in the range of about 15-40 degrees.*

*15. The vented soffit panel of claim 11, further comprising:*

*a third row of holes disposed in the top wall vertically above the second panel section and laterally outside of the exposed width; and*

*a fourth row of holes disposed in the second sidewall.*

*16. The vented soffit panel of claim 15, wherein each of the holes has a substantially circular shape with a diameter in the range of about 0.080 to 0.100 inches, and wherein the first row of holes is offset from the third row of holes such that the spacing between adjacent holes in the rows is in the*

*range of about 0.15-0.30 inches and the spacing between the first row holes and the third row of holes is in the range of about 0.10-0.20 inches.*

*17. A method of manufacturing a vented soffit panel, comprising the steps of:*

*passing a material through a rotary perforation machine to create a perforated blank having a first row of holes and a second row of holes extending substantially along a width of the perforated blank; and*

*folding the perforated blank to create a vent channel defined by first and second panel sections, wherein the vent channel has a generally dove-tailed shape defined by:*

*a first sidewall extending from the first panel section at a first acute angle relative to the first panel section, and forming a first corner;*

*a second sidewall extending from the second panel section at a second acute angle relative to the second panel section, and forming a second corner;*

*a top wall extending between the first sidewall and the second sidewall, a third acute angle formed between the top wall and the first sidewall and a fourth acute angle formed between the top wall and the second side wall, wherein the first, second, third and fourth acute angles are substantially equal; and*

*an opening extending between the first and second corners and forming an exposed width that projects substantially perpendicular to the top wall;*

*wherein the first row of holes are disposed in the top wall vertically above the first panel section and laterally outside of the exposed width; and*

*wherein the second row of holes are disposed in the first sidewall.*

*18. The method of claim 17, wherein the step of folding the perforated blank includes creating a plurality of vent channels.*

*19. The method of claim 17, wherein the step of folding the perforated blank includes creating the vent channel having a height and the top wall having an overall width that is at least three times the height of the channel.*

*20. The method of claim 17, wherein the material is aluminum.*

* * * * *